United States Patent [19]

Foti

[11] Patent Number: 4,905,012
[45] Date of Patent: Feb. 27, 1990

[54] POWER EFFICIENT FEED NETWORK FOR TACAN ANTENNA ARRAYS

[75] Inventor: Stephen J. Foti, Tenterden, United Kingdom

[73] Assignee: ISC Cardion Electronics, Inc., Woodbury, N.Y.

[21] Appl. No.: 362,914

[22] Filed: Jun. 8, 1989

[51] Int. Cl.$^4$ .............................................. G01S 1/44
[52] U.S. Cl. .................................... 342/399; 342/373
[58] Field of Search ................ 342/373, 399, 368, 372

[56] References Cited

U.S. PATENT DOCUMENTS 4,197,542  4/1980  Hofgen .
4,641,142  2/1987  Greving et al. .

*Primary Examiner*—Theodore M. Blum
*Attorney, Agent, or Firm*—Pollock, Vande Sande & Priddy

[57] ABSTRACT

An antenna feed for a TACAN circular array. A power divider divides a source of radio frequency signals into zero, first and ninth order mode signals. A second power divider divides the zero mode input signal into a plurality of output signals each driving a pair of elements of the TACAN array. A second conventional matrix of radio frequency components receives the first and ninth mode excitation signals. A phase combining network combines the first and ninth mode signals so as to produce a plurality of signals each driving a pair of antenna elements. An output hybrid coupler combines the zero phase mode with the phase combined signals to produce the required TACAN azimuth antenna pattern.

8 Claims, 2 Drawing Sheets

POWER EFFICIENT FEED NETWORK FOR TACAN ANTENNA ARRAYS

BACKGROUND OF THE INVENTION

The present invention relates to TACAN antenna arrays. Specifically, a highly efficient feed network is described which reduces RF power losses to a TACAN antenna array.

For many years, TACAN navigation systems have been used on board aircraft for determining an aircraft position. On the ground, a transmitting antenna array is provided which generates a rotating azimuth pattern. The rotating pattern has a basic cardioid shape, and includes nine minor lobes, as well as the cardioid main lobe. The nine minor lobes constitute an envelope modulation of the azimuth pattern superimposed on the cardioid pattern. The cardioid pattern rotates at 900 RPM. Aircraft position is determined by noting the position of the rotating pattern with respect to the aircraft when the pattern is pointing to a true North reading. By noting the position of the cardioid and the nine lobes with respect to the aircraft, it is possible to determine the bearings of an aircraft.

The required antenna pattern having the nine minor lobes superimposed on the rotating cardioid is derived by a multi-element circular array. The array is driven with a feed network which excites each element of the array with energy having a distribution to produce the required cardioid and nine lobes.

A common feed network used to drive the multi-element circular antenna array is the Butler matrix network, which receives two pairs of continuously phase shifted RF signals, and a larger amplitude constant phase RF signal. The constant phase RF signal generates an omni-directional azimuth pattern. The first pair of the continuously phase shifted secondary RF signals modulates the omni-directional pattern to provide the cardioid pattern which rotates at the rate of 15 Hz. and the second pair are phase shifted at nine times the 15 Hz. rate to produce the rotating nine lobe envelope function.

The Butler matrix is advantageous in that the amplitude modulation envelope results from combining phase displaced energy radiated from each element of the array. However, to derive the typical 32 RF signals for driving 32 TACAN array elements, the matrix requires a considerable number of phase shifting, power splitting and power combining elements. The number of elements in the matrix increases the net insertion loss and then lower loss transmission medium must be used in order to meet gain specifications of the TACAN array. This imposes an increased cost of manufacture for the individual matrix elements. Additionally, if the large amplitude constant phase zero mode omni-directional signal must pass through all of these network elements, the cost of manufacture is increased because the elements must handle higher power signals.

SUMMARY OF THE INVENTION

It is an object of this invention to provide a TACAN antenna feed network.

It is a more specific object of this invention to provide a feed network for a TACAN antenna having reduced insertion loss.

These and other objects are provided by a feed network in accordance with the invention. A feed network is constructed using a modified Butler matrix such that the components which normally would carry the zero mode omni-directional constant phase excitation energy do not and this energy is carried by a low loss simpler network which is then recombined with the other output signals of the modified Butler matrix network. First order mode and ninth order mode inputs which receive the phase modulated RF signals for effecting the cardioid rotation, and nine lobe rotation of the azimuth pattern, are connected through conventional Butler network circuitry, terminating in a plurality of hybrid networks which are conventional to Butler networks. The hybrid networks have a plurality of outputs connected to excite each antenna element.

The zero mode constant phase RF signal, which produces the higher level, omni-directional component of the radiated azimuth pattern, is derived by a power divider having a plurality of divided power outputs connected to a remaining input of each of the hybrid circuits.

That portion of the prior art Butler network which divided the zero mode constant phase RF signal into a plurality of signals equal in number to the number of antenna elements, is effectively replaced by the power divider circuit having considerably less insertion loss. The remaining portion of the feed network includes Butler circuitry which processes the first and ninth phase mode signals as in the prior art. However, the entire power handling requirements of the Butler elements are reduced, since only the lower power first and ninth mode phase signals are processed by the Butler circuitry. The power divider reduces the insertion loss for the antenna feed. The separate Butler matrix components may be designed to handle the lower power levels represented by the first and ninth mode excitation signals, resulting in reduced cost in component design.

DESCRIPTION OF THE PREFERRED EMBODIMENT

Figure 1:
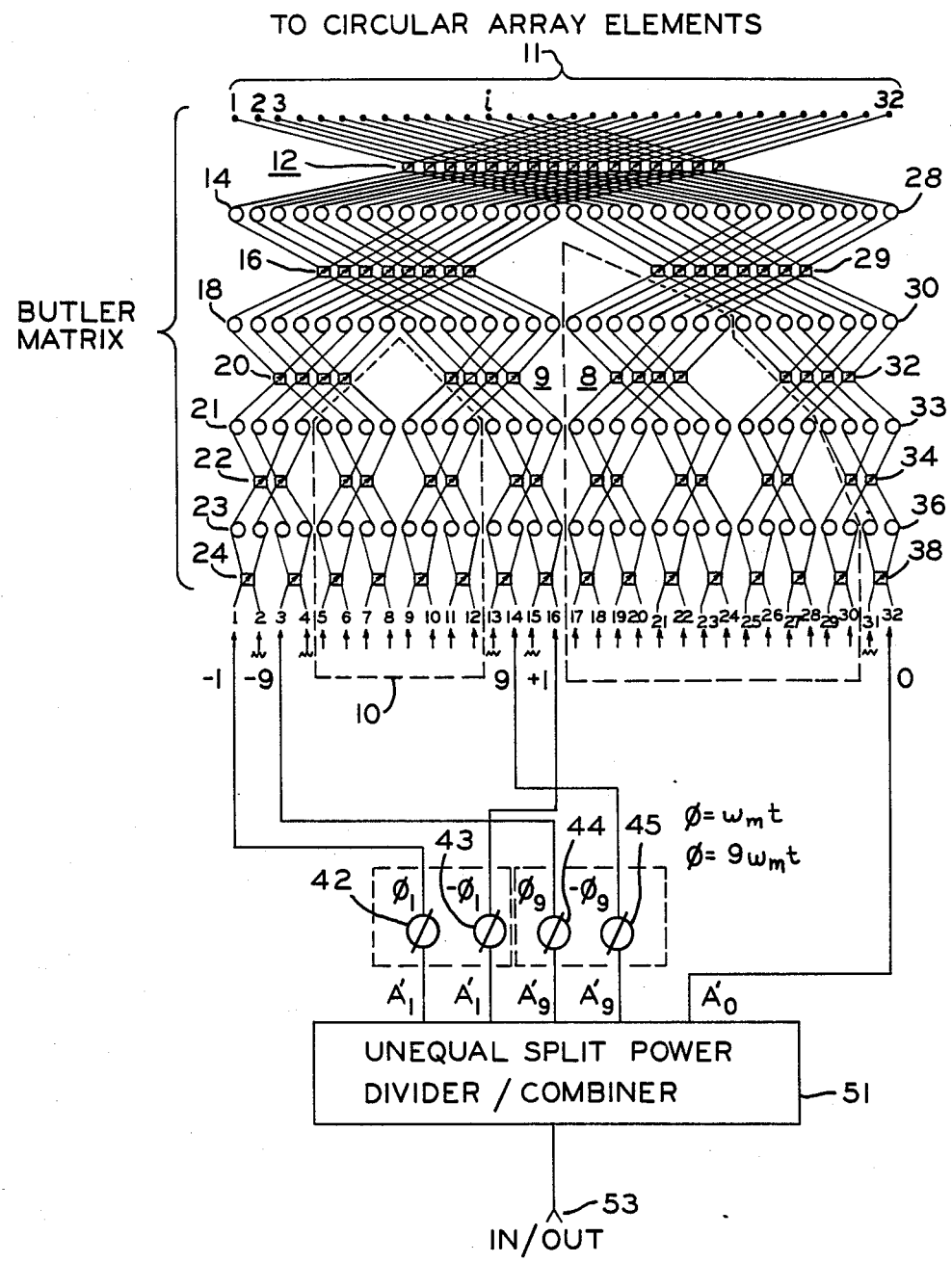
FIG. 1 illustrates a prior art standard Butler matrix feed for a TACAN antenna array.

FIG. 1 illustrates the standard Butler matrix network which is used to feed a 32 element circular TACAN array. The TACAN array elements are denoted as 11. Thirty-two input ports are shown with the overall matrix divided in first and second sections 8 and 9.

Each of the sections 8 and 9 is terminated in a 180° hybrid circuit 12 which combines two signals and supplies two signals to a pair of the circular array elements. Each section 8, 9 of the Butler matrix includes a plurality of phase shift elements 14 and 28 fed by additional 180° hybrid couplers 16 and 29.

Additional phase shift networks 18, 21, 23, 30, 33 and 36 are used, along with additional hybrid couplers, terminating on the thirty-two inputs. Unused inputs are terminated in standard impedance terminations.

The foregoing demonstrated Butler matrix provides the desired signal distribution between elements of the thirty-two element circular TACAN array. Energy entering the zero mode input, shown as input 32, is distributed in phase, equally to all thirty-two TACAN array elements. This produces the omni-directional component of the azimuth pattern of the TACAN array.

The cardioid is formed by introducing energy into ports 1 and 16 to thus form a cardioid from the omni-directional pattern produced by the zero mode input energy. The energy entering the first mode inputs 1 and 16 results in energy being fed to the thirty-two circular array elements in a superposition of positive and negative phase progressions of 11.5° per element so that the cardioid pattern is produced when these signals combine with the omni-directional energy.

Additionally, a higher ninth order mode input is applied to inputs 3 and 14 to produce positive and negative phase progressions which are nine times the phase progressions for the first order mode.

The resulting multi-lobed azimuth modulation distribution function is defined by the following:

$$V_i(t) = A_0 + A_1 \cos(\omega_m t - \phi_i) + A_9 \cos 9(\omega_m t - \phi_i)$$

which may be written in phasor notation as:

$$V_i(t) = A_0 + (A_1/2)(e^{j(\omega_m t - \phi_i)} e^{-j(\omega_m t - \phi_i)}) + (A_9/2)(e^{j9(\omega_m t - \phi_i)} + e^{-j9(\omega_m t - \phi_i)})$$

where
 $V_i(t)$ = voltage excitation of the $i^{th}$ circular array element (= 1, 2 ... N)
 $\phi_i = (i-1)\Delta\phi$, i-1, 2, 3 ... N
 $\Delta\phi = 360°/N$
 $\omega_m = 2\pi f_m$
 $f_m = 15$ Hz.
 N = 32.

This azimuth pattern is caused to rotate by virtue of changing the phase of the input signals applied to the first and ninth order mode inputs of the Butler matrix. Shown in FIG. 1 are standard electronic variable phase shifters 42, 43, 44 and 4, which change the phase of these zero and ninth mode signals so as to rotate the entire azimuth pattern.

An unequal power divider combiner 51 is shown to split the RF energy on input 53 into a plurality of outputs which correspond to the coefficients $A_0$, $A_1$ and $A_9$ of the foregoing equation, modified by any insertion loss experienced by the phase shift elements.

The zero and ninth modes are phase shifted by shifting the phase of the energy in opposite directions, which appears on ports 1 and 16, and ports 3 and 14.

The phase of the first order mode is shifted at a frequency of 15 Hz. The ninth order mode is shifted at nine times this frequency.

The foregoing Butler matrix is symmetrical so that sections 8 and 9 are the same. It should be noted that the bulk of section 8 includes components which in some cases are unused, having inputs terminated by a standard termination. Section 8 processes the zero mode RF energy. The zero mode RF energy amplitude is substantially larger than the other two modes. Sections 8 and 9 share the 180° hybrid couplers 12, combining the energies from each section 8 and 9 to drive each of the circular array elements 11.

In designing the feed network of FIG. 1, consideration must be given to the power levels which are to be transferred from the power divider 51 to the circular TACAN array elements 11. As the zero mode is the larger amplitude signal, the component design is determined on the basis of power requirements for the zero mode. Insertion losses for the zero mode may typically run as high as 3 to 4 dB in the conventional Butler matrix. Accommodating the necessary power levels and insertion loss, while maintaining the required phase shifts, imposes expensive component design for the network.

The present invention makes use of the realization that the zero mode path within the network constitutes a majority of the total loss for the network which also imposes on the remaining portion of the network component design requirements.

The present invention provides an advantage over the conventional Butler matrix in that the zero mode phase path for the network is separate and distinct from the remaining portion of the network, and produces less insertion loss.

Figure 2:
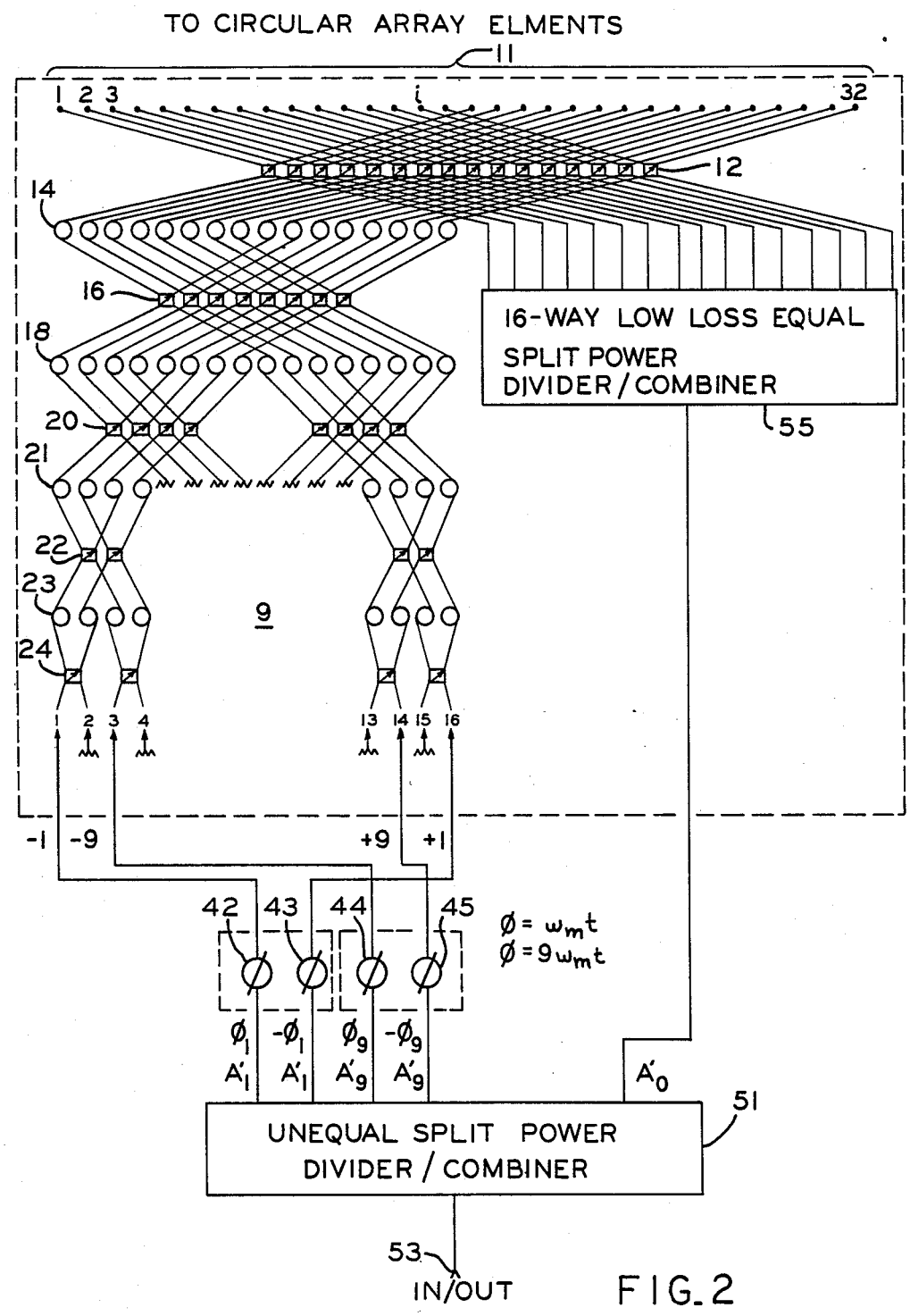
FIG. 2 represents the preferred embodiment of the present invention, including the modified Butler matrix.

Turning now to FIG. 2, there is shown an implementation of the present invention which will avoid the insertion losses of the conventional Butler matrix, and permit design of the components of the Butler matrix network to be dictated by the power requirements for the first and ninth mode signal paths. The feed network of FIG. 2 substantially removes section 8 of the standard Butler matrix while retaining the output 180° hybrid couplers 12. A 16-way low loss equal split power divider 55 is shown which is directly connected to the unequal power splitter 51 zero mode output port. The 16-way power divider/combiner may be of the high efficiency, radial waveguide power divider type, specifically described in an earlier publication entitled "Sixty Way Radial Combiner Uses No Isolators", Microwaves and RF (Design Feature), July 1984. This 16-way power divider is connected to the zero mode feed line and has losses much lower than the standard Butler matrix zero mode RF path.

Due to the reduced insertion loss for the zero order mode, the power outputs from the unequal power divider combiner 51 output signal.

Section 9 of the modified matrix may be identical to section of Figure or the dashed section 10 may be removed terminating the inputs of hybrid couplers 20 with standard load impedances.

An additional advantage is realized by reducing the total insertion loss through the feed network of the TACAN array. The lower power levels permit component design to be less expensive. This is also seen in the design of the phase shifters 42, 43, 44 and 45. These phase shifters may be of the type which use low cost pin diodes for effecting phase change. Reduction of the power levels through these phase shifters results in reduced cost of their manufacture as well. This is facilitated by the fact that the active RF modulation networks (the phase shifters in this case) do not carry the high zero order mode energy in contrast to some TACAN feed networks previously developed.

It should be noted that with the foregoing embodiment of FIG. 2, it is possible to use the see-saw phase shifter, as is described by the article entitled "See-Saw Phase Shifter Cuts Cost of Phased Array", Microwaves and RF (Design Feature), March 1987, and described in U.S. Pat. No. 4,751,453 issued Jun 14, 1988.

Thus, there is described an embodiment of the invention which will permit overall insertion loss and the corresponding advantages which result to be realized in a TACAN feed network. Those skilled in the art will recognize yet other embodiments of the invention described more particularly by the claims which follow.

What is claimed is:

1. An antenna feed for a circular array of antenna elements which generate a TACAN radiation envelope comprising:
   a source of radio frequency signals;
   a power divider for providing first and second pairs of radio frequency signals from said source, and one additional signal larger in amplitude than each of said signals of each pair;
   a first pair of phase shifters connected to receive said first pair of signals, and phase shifting said first pair of signals at a first periodic frequency;
   a second pair of phase shifters connected to receive said second pair of signals and phase shifting said signals at a second periodic frequency;
   a feed matrix connected to each element of said circular array, including a plurality of hybrid networks equal to one half the number of said elements, each having a pair of output ports connected to a pair of said and a pair of inputs;
   a second power divider for dividing said one additional signal into a plurality of signals equal in number to said number of hybrid networks, and supplying each of said plurality of said signals to one input of each hybrid network;
   a phase shift network having first and second pairs of inputs connected to each pair of phase shifters, and providing a plurality of outputs for the remaining inputs of said hybrid networks, whereby a combined signal proportional to the sum of said phase shifted signals is applied to each hybrid; and,
   said circular array forming a pattern of radiation having an omni-directional component produced by said additional output signal and first and second modulation components from said first and second pairs of phase shifters.

2. The antenna feed of claim 1 wherein said second power divider divides said one additional signal into 16 signals of equal amplitude.

3. The antenna feed of claim 1 wherein said phase shifters are see-saw phase shifters.

4. The antenna feed of claim 1 wherein said second power divider is a radial waveguide power divider.

5. The antenna feed for a circular array of antenna elements which generate a TACAN radiation envelope comprising:
   a power divider for dividing a source of radio frequency signals into a first signal for generating a first modulation component for said envelope, a second signal representing a second modulation component of said envelope, and a third signal representing an omni-directional component of said envelope;
   a second power divider for dividing said third signal into a plurality of equal amplitude signals equal to one half the number of said antenna elements;
   first and second phase shifters connected to receive said first and second signals, and phase shifting said signals in accordance with first and second time varying functions; and,
   a matrix of radio frequency components including a plurality of hybrid networks equal to one half the number of said elements having a pair of output terminals, each connected to a different element, and a pair of inputs, one input of each hybrid being connected to receive one of said second power divider plurality of output signals, and including a phase combining network for combining said first and second phase shifter signals into a plurality of individual signals equal in number to said number of hybrid circuits, each of said individual signals being connected to a remaining input of said hybrid networks, whereby said elements are driven with a composite signal which includes an omni-directional component along with first and second modulation components.

6. The antenna feed of claim 5 wherein said second power divider provides substantially zero phase shift between each of said plurality of output signals.

7. The antenna feed of claim 5 wherein said first and second signals constitute a small portion of the total signal power delivered to said first power divider.

8. The antenna feed of claim 5 wherein said second power divider has a lower insertion loss than said phase combining network.

* * * * *

UNITED STATES PATENT AND TRADEMARK OFFICE
CERTIFICATE OF CORRECTION

PATENT NO. : 4,905,012
DATED : February 27, 1990
INVENTOR(S) : Stephen J. Foti

It is certified that error appears in the above-identified patent and that said Letters Patent is hereby corrected as shown below:

In column 5, claim 1, line 20, after "said" insert

--elements,--.

Signed and Sealed this

Thirteenth Day of August, 1991

Attest:

HARRY F. MANBECK, JR.

*Attesting Officer*   *Commissioner of Patents and Trademarks*